INVENTOR.
ORLY MUSGRAVE
BY Jerome P. Bloom
ATTORNEY

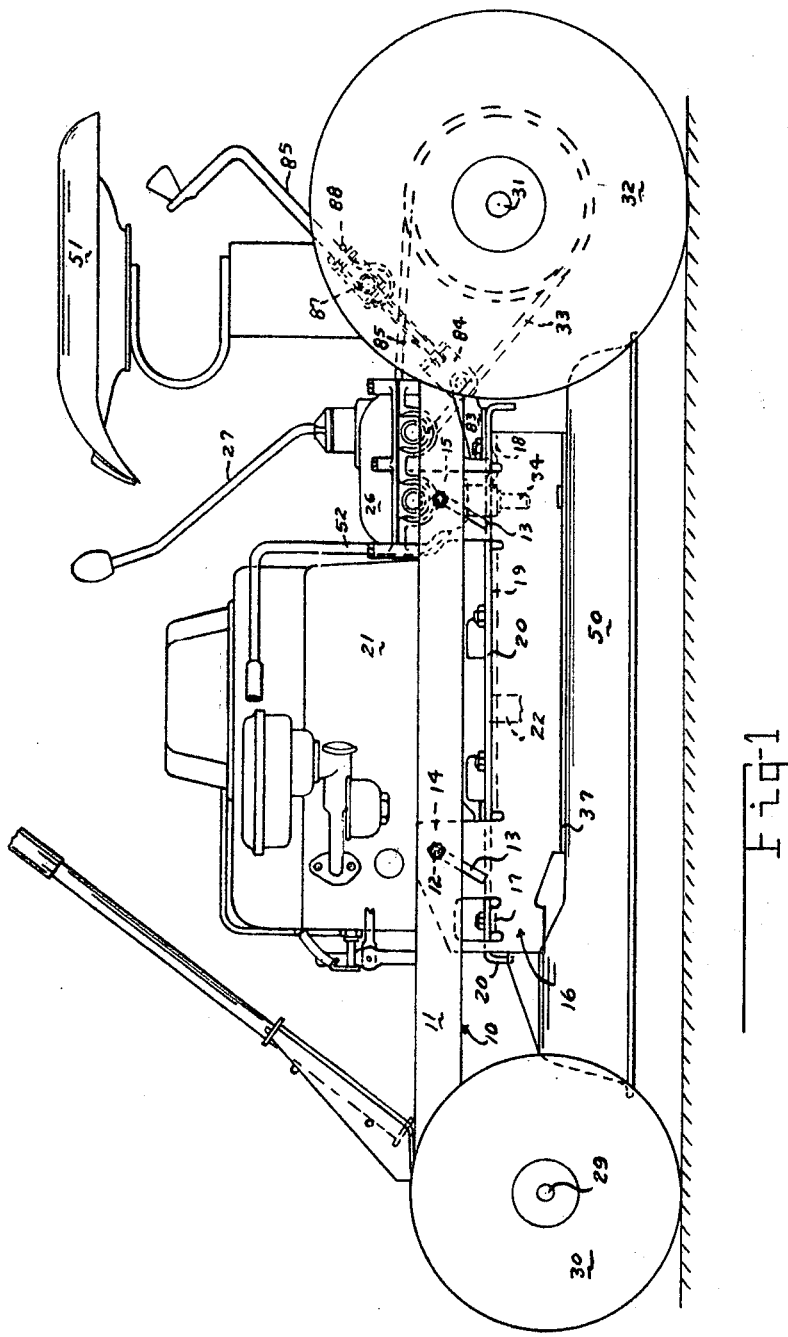

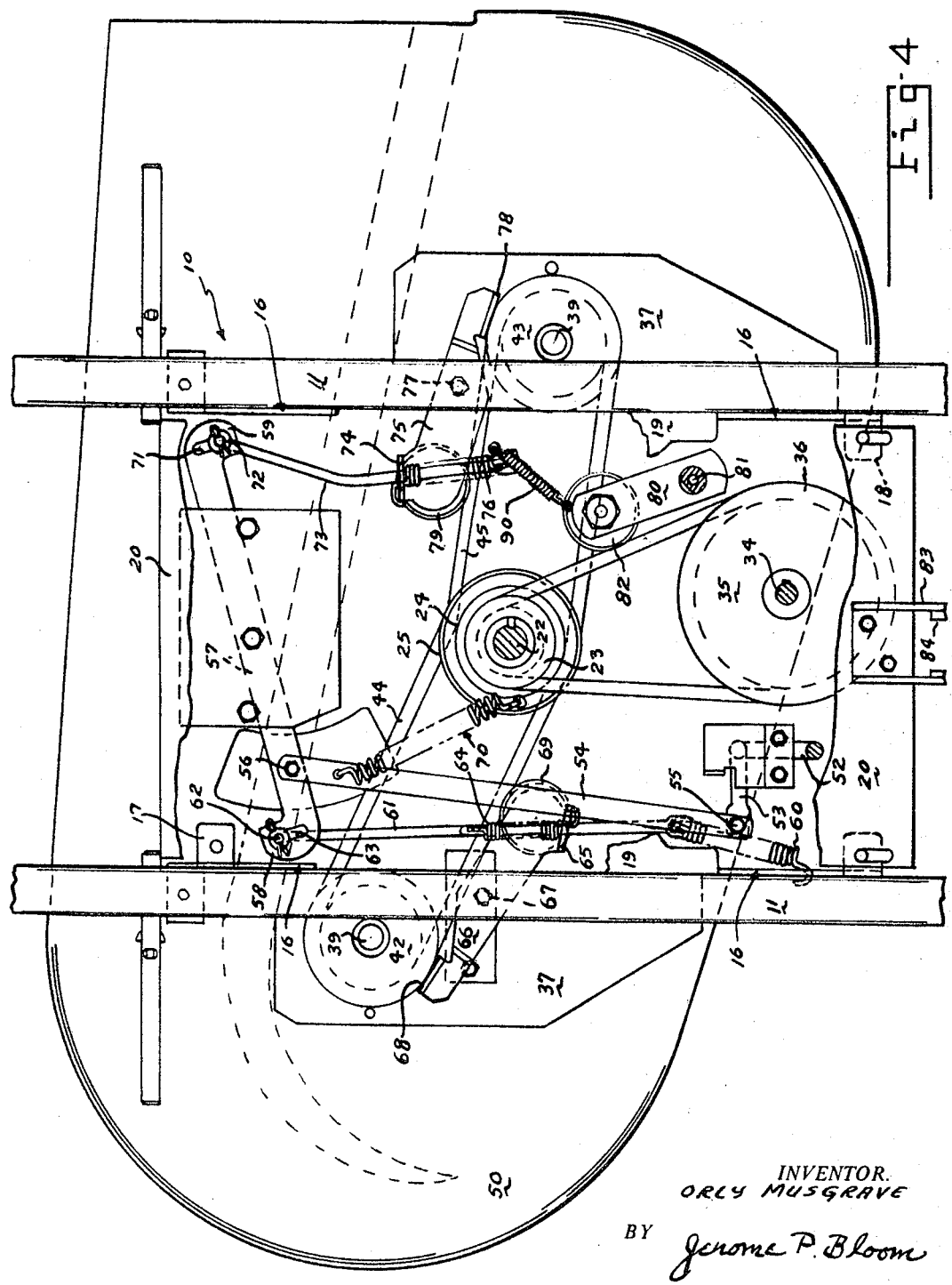

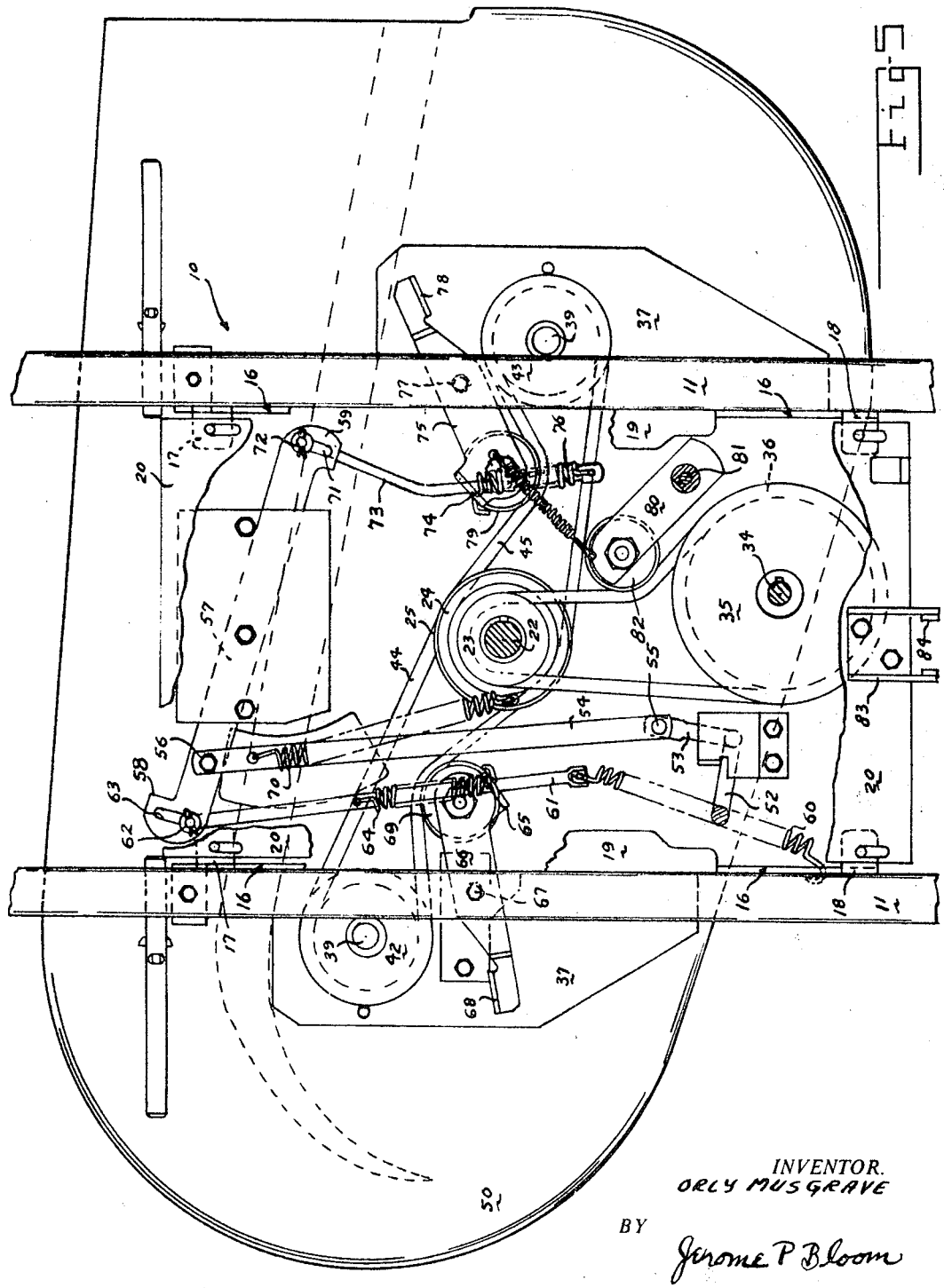

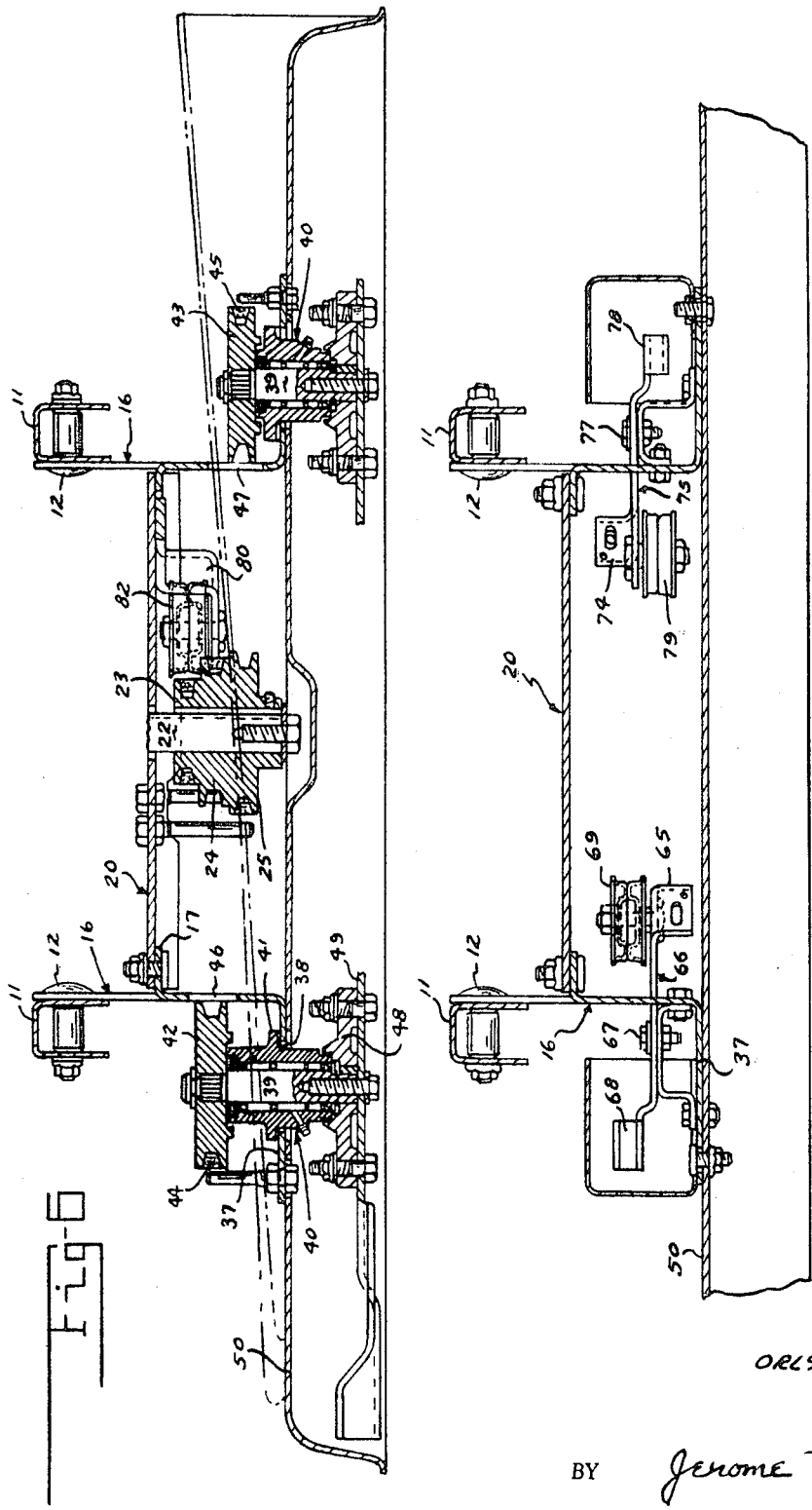

United States Patent Office 3,460,325
Patented Aug. 12, 1969

3,460,325
LAWNMOWERS AND LIKE EQUIPMENT
Orly Musgrave, Springfield, Ohio, assignor to Mast-Foos Manufacturing Company, Springfield, Ohio, a corporation of Ohio
Filed May 20, 1966, Ser. No. 551,746
Int. Cl. A01d 35/12, 35/26
U.S. Cl. 56—25.4     14 Claims

ABSTRACT OF THE DISCLOSURE

A rotary lawnmower or the like having a plurality of spindle mounted cutters, the spindles being commonly mounted to a vertically adjustable suspended platform supporting also a motor and transmission for drive of the cutters. Controls to clutch the power drive to the rotary spindles feature a common operating lever pivotally adjustable from a single control means. The spindles are so energized in sequence to obviate starting under high load conditions.

---

This invention has particular advantage in application to lawnmowers and like equipment and will be so described. In reference to lawnmowers, it features improved controls for their cutting elements, enabling a more efficient and effective starting procedure and a simpler yet more effective brake system for the cutting elements per se. The invention further contemplates an improved means and method for mounting spindles to lend a dynamic as well as a static stability to affixed cutter elements. These and other features of novelty will be readily apparent from the following.

While the invention will be described in an illustrative embodiment, such is not intended as limiting the form or the application of its pertinent features.

A primary object of the invention is to provide starting and braking controls having particular advantage in lawnmowers and like equipment which controls are economical to fabricate, more efficient and satisfactory in use, adaptable to a wide variety of applications and unlikely to malfunction.

Another object of the invention is to provide an improved spindle mount in lawnmowers and like equipment.

A further object of the invention is to provide an improved starting system for plural operating elements in lawnmowers and like equipment.

An additional object of this invention is to provide a simple system for braking plural working elements in lawnmowers and like equipment.

Another object of the invention is to provide control apparatus for use in lawnmowers and like equipment possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a partly schematic side elevation of a riding lawnmower incorporating plural cutting blades and embodying the invention features;

FIG. 4 is a partially schematic view of the controls which selectively inter-relate the mower cutting blades with their drive motor, parts being disposed to maintain the blades in a braked condition;

FIG. 5 is a view like FIG. 4 with parts disposed to maintain the blades in a driven condition; and FIGS. 6, 7 and 8 are sectional views illustrating construction details entailed in the employment of the invention features.

Like parts are indicated by similar characters of reference throughout the several views.

Figure 2A:
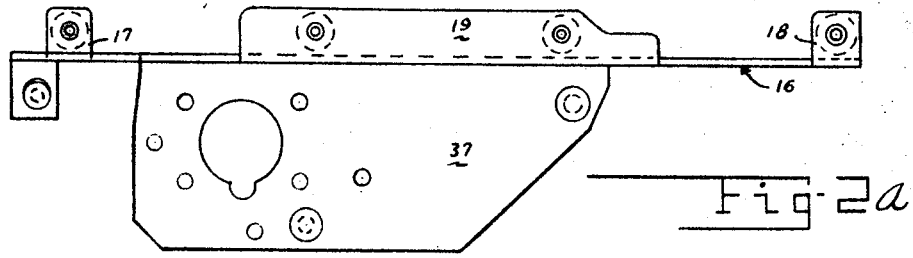
FIGURES 2a and 3a are top views of the elements of FIGURES 2 and 3, respectively.
Figure 2:
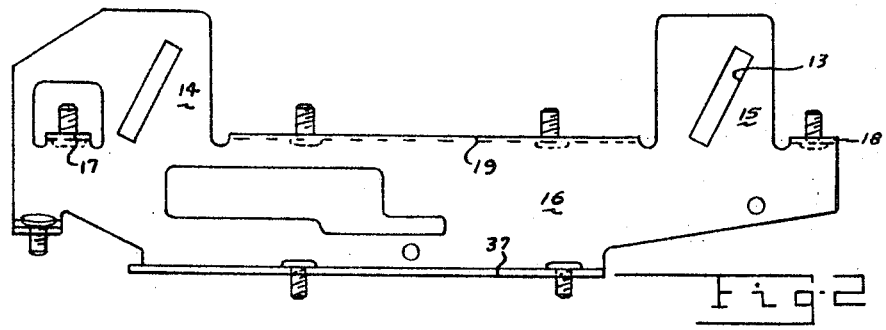
FIGS. 2 and 3 are side views illustrating the left and right hand spindle mounting elements which interconnect to the basic mower frame.
Figure 3:
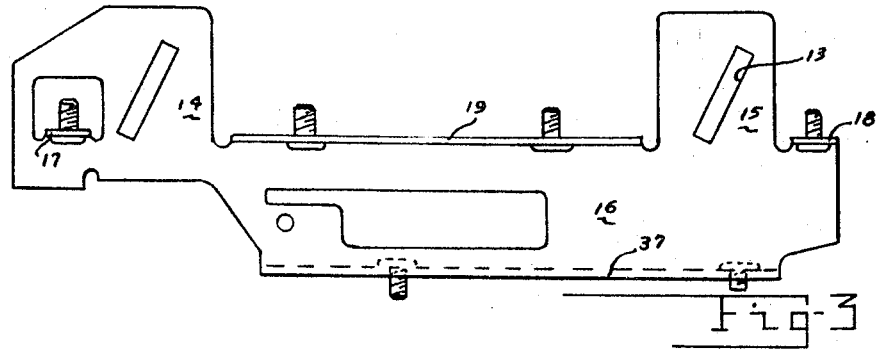
Figure 3A:
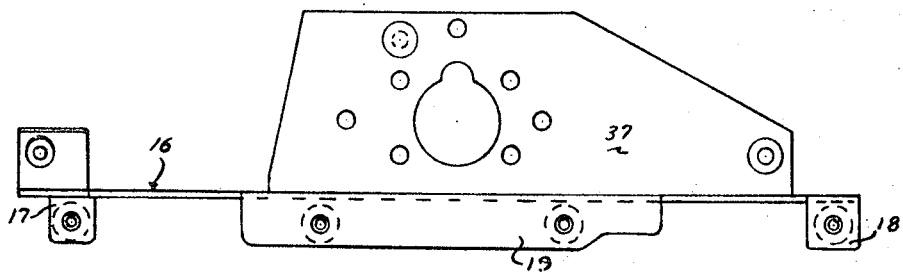
Figure 8:
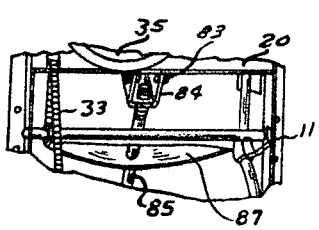

As illustrated, the lawnmower embodiment is detailed only to the extent necessary for an understanding of the present invention.

The mower includes a base comprising a generally rectangular open frame 10, the sides of which are formed by parallel beams 11. The latter have an inverted U shape, transversely bridged at longitudinally spaced intervals by bolts 12. The bolts are disposed in transversely aligned pairs to project inwardly in a plane common to the open frame. At either side of the frame the inner ends of a pair of longitudinally spaced bolts 12 project through slots 13 in longitudinally spaced upward extensions 14 and 15 of a vertically dependent plate element 16.

In respect to each plate 16 the extension 14 lies to one end and includes a blanked out rectangular portion 17. The latter is bent in a direction inwardly of the frame and at right angles to the plate. The plate extension 15 is short of the other end of the plate which end includes, at its upper edge, a right angled flange like portion 18. The portion 18 is similar to and co-planar with the portion 17. Intermediate the extensions 14 and 15, the relatively depressed upper edge of the plate 16 includes a generally right angled, inwardly projected, support flange 19 which is co-planar with the plate portions 17 and 18.

The plate portions 17-19 on either side of the frame 10 thus provide a platform to which is fixed a plate 20. The plate 20, in turn, mounts a conventional motor 21 having a manual start, such as normally employed in a lawnmower power unit. The motor drive shaft 22 has a vertical orientation and depends through a relatively centered opening in the plate 20. The shaft 22 fixedly mounts a series of pulleys 23, 24 and 25 respectively at successively lower positions below the underside of the plate 20.

As seen in FIG. 1 of the drawings, the plate 20 further mounts a gear box 26 having a projected shift stick 27. The box 26 is spaced rearwardly of the motor 21.

Transversely aligned pairs of conventional brackets respectively depend from the front and rear ends of the frame 10. These brackets conventionally contain, in the one instance, a front axle 29 mounting front wheels 30 and, in the other instance, a rear axle 31 mounting rear wheels 32.

The gear box 26 contains a set of gears conventionally arranged to receive and transmit motive power to the rear axle 31 by way of a chain drive 33. The details of such a drive are well understood by one versed in the art and not in and of themselves essential to an understanding of the present invention. Therefore, they will not be further described. Suffice it to say that the motive power is transmitted to the gear box by way of an input shaft 34. The latter depends to the underside of the plate 20 where it fixedly mounts a pulley 35. The motor drive pulley 23 and the pulley 35 are interrelated by a continuous belt 36.

Each of the plates 16 incorporates, at its lower edge, a right angled plate extension 37 which projects outwardly of the frame 10. The extension 37 includes an opening 38 for a spindle unit 39 rotatably contained in a cylindrical bearing housing 40. The housing 40, in each case, has a vertically intermediate flange 41 which limits the extent of its dependency from the plate portion 37. The upper end of each spindle is splined and projects upward of its housing 40 to fixedly mount in one case a pulley 42 and in the other case a pulley 43.

As seen in the drawings, the flanges 41 are differently positioned on their associated housings so the one housing 40 projects vertically from its mounting plate portion 37 to a greater extent than the other. In this manner, the pulley 42 is fixed in the plane of the motor drive pulley 24 to interconnect therewith by means of a continuous belt 44. The other pulley 43 is disposed in the plane of the pulley 25. A continuous belt 45 interconnects the pulleys 43 and 25.

An aperture is made in the vertical section of each plate 16. This aperture 46 in the one plate is positioned to accommodate a peripheral portion of the adjacent pulley 42. The aperture 47 in the other plate is positioned to accommodate the adjacent peripheral edge of pulley 43. This enables a most compact disposition of parts.

Fixed by suitable adapter means 48 to the lower end of each spindle 39 is a cutting blade assembly 49. As may be seen in FIG. 6 of the drawings, a blade covering mower deck 50 is bolted to the underside of the plate extensions 37. The deck 50 is suitably apertured to accommodate the projection therethrough of spindle housings 40. It may thus be seen the spindles 39 stably mount on the frame 10 by way of the plates 16, which also support the deck 50.

A driver's seat 51 is structurally elevated on the rear end of the frame 10. Immediately forward thereof, a clutch control stick 52 projects generally perpendicular to the plate 20.

The upper end of the stick 52 is offset and right angled while its lower end bearingly mounts in and projects through the rear end portion of the plate 20. At its lowermost extremity 53 the clutch stick is bent to parallel the underside of the plate. The end 53 pivotally connects to the rear end of a bar 54 by means of a pivot element 55. The remote end of bar 54 pivotally connects at 56 to a centrally pivoted control bar 57. The bar 57 mounts to structure fixed at the underside of the plate 20 transversely of its forward end. The bar 57 has a co-planar slotted extension at right angles to either end. The one extension 58 which is immediately adjacent the bar 54 projects in a sense forwardly of the frame 10. The other extension 59 has a reverse direction.

A coil spring 60 has one end thereof anchored to the beam 11 adjacent and immediately rearward of the end 53 of the clutch stick 52. The other end of the spring 60 hooks through an aperture in one end of a control rod 61. From the spring 60 the rod 61 extends forwardly to pass through a transversely elongated slot in an ear-like projection 65 on a control arm 66. The other end of rod 61 mounts a right angled stud 62 which extends through and rides in the slot 63 in the bar extension 58.

A further coil spring 64 is wrapped around an intermediate portion of the longitudinal extent of the control rod 61. The end of spring 64 most adjacent the bar 57 is anchored by suitable means to the body of rod 61. Its opposite end hooks through an aperture in the ear-like projection 65 which positions at one end of the control arm 66. The arm 66 has a centrally located pivot connection 67 to a bracket on the plate extension 37 most adjacent the bar 54.

The end of arm 66 remote from the ear 65 projects outwardly of frame 10 through an opening in a plate 16. The extremity thereof is formed as a braking shoe 68 positioning in a plane enabling the selective engagement thereby of a portion of the drive belt 44 in a braking relation to the pulley 42. The other end of arm 66 positions inwardly of the frame 10 and pivotally mounts a clutch wheel 69 the function of which will be further described.

A spring 70 has one end anchored to bar 54 at a point immediately adjacent its end which pivotally connects to the control bar 57 while the other end of this spring anchors to the plate 20 at a point relatively adjacent the motor drive shaft 22. The spring 70 is operative to apply a bias to the bar 54 in a sense rearwardly of the frame 10.

Adjacent the opposite side of the frame 10, riding in the slot 71 of bar extension 59 is a stud 72 which is fixed perpendicularly to one end of a bent control rod 73. The latter extends rearwardly to and through an opening in an ear portion 74 of a control arm 75. Coiled about the rearwardly projected end of rod 73 is a spring 76 one end of which hooks to the ear 74 and the other end to the rear end of the rod. The arm 75 is connected by a pivot 77 to a bracket on the plate extension 37 most adjacent the rod 73. The one end of arm 75 remote from ear 74 projects outwardly of the frame through an opening in the adjacent plate 16 and terminates in a brake shoe 78 selectively adapted, on proper disposition, to apply pressure to fix a portion of the drive belt 45 in a braking relation to the pulley 43. The innermost end of the control arm 75 mounts a roller 79 which is adapted to serve as a clutch in a manner similar to the wheel 69.

It is to be noted that there is a further control arm 80 fixed to a control rod 81 which depends through the plate 20, in bearing relation thereto. The end of the arm 80 remote from its control rod 81 mounts a clutch wheel 82 selectively actuable by appropriate adjustment of the rod 81 to engage an intermediate portion of the belt 36 which interconnects the motor drive pulley 23 and the pulley member 35. A spring 90 interconnects the arm 80 to the plate 20 to normally bias said arm from the related belt.

At the rear extremity of its upper surface the plate 20 mounts a bifurcated bracket 83 the arms of which project upwardly and rearwardly of the plate. An oppositely directed bifurcated bracket 84 has the arms thereof respectively pivotally fixed to the arms of the bracket 83. Projected through the rearmost bridging portion of the bracket 84 is a threadedly related shaft 85, suitable means being attached to the bracket to provide a relatively fixed nut for cooperation with the shaft.

Mounted by suitable support means in a sense transversely of the beams 11, in an elevated relation to their rear ends, is a pivoted generally U-shaped bar member 87. The shaft 85 extends through the legs of the bar 87 and mounts suitable means 88 to the outer sides of such legs to prevent its relative longitudinal movement. At its uppermost and rearmost end which positions over the rear wheels of the mower, the shaft 85 has a right angled handle portion which on rotation thereof will induce a threaded adjustment of the bracket 84 in a sense longitudinally of the shaft. By this means and through the medium of the connecting bracket 83 having a fixed relation to the plate 20 which mounts motor 21, the interconnected plates 16 and the portions 37 thereof which, in turn, mount the cutter pulleys 42 and 43, the deck 50 and contained cutter blades, the entire connected structure may be readily raised or lowered a predetermined amount. This vertical adjustment is enabled by the slots 13 of the plates 16 and limited by the bolts 12 which project therethrough. It will of course be obvious that releasable nuts at the projected extremities of the bolts 12 may be employed to clamp the plates 16 to the beams 11 at the selected position of adjustment which is necessary or desirable at any particular time to establish the cutting blades at a predetermined elevation referenced to the ground surface.

Prior to use of the described structure in the first place, as seen in FIG. 4 of the drawings, the control element 82 will be disengaged from the drive belt 36, and the shoe 68 on the arm 66 will be clamping a portion of the belt 44 in braking relation to the pulley 42, the wheel 69 being displaced to leave the belt portions intermediate the motor drive pulley 24 and pulley 42 in a slack condition. Similarly the brake shoe 78 will be in a position wedging a portion of the belt 45 to the pulley 43 while the clutch wheel at the other end of the arm 75 is relatively displaced to leave the intermediate runs of the belt 45 between the motor drive pulley 25 and spindle 43 is a slack condition.

A conventional start of the motor 21 will energize its drive shaft 22 to produce a corresponding drive of the interconnected pulleys 23, 24 and 25. A rotation of the clutch control stick 52 will then cause its arm portion 53 to move forwardly of the frame 10 and push the bar 54 in the same sense, against the bias of the interconnected spring 70. The movement of the bar 54 produces a corresponding pivoting of the control bar 57. This results in the extension 58 moving freely until the rear end of its slot 63 encounters the stud 62 and pulls rod 61 forward against the bias of spring 60. The spring 64 is correspondingly stressed to resiliently urge the wheel mounting end of the arm 66 in a forward sense. This results in the wheel 69 clutching an intermediate run portion of a belt 44 to thereby take up its slack and achieve a drive connection between the pulley 24 and the pulley 42. The rotation of the arm 66 displaces the brake shoe 68 whereupon the motor 21 will commence a drive of the cutter element which has an integral connection with the pulley 42.

With the rotation of the bar 57 its other extension 59 pivots in a rearward sense. There is no following movement until the stud 72 encounters the forward end of slot 71. Continued pivoting of bar 57 causes the connected rod 73 to be forced rearwardly against the bias of spring 76 which resiliently connects to the ear 74 of control arm 75. This pulls the arm 75 rearwardly to displace its brake shoe 78 from belt 45 and position its drive wheel 79 in clutching engagement with an intermediate portion of belt 45. This takes up the slack in the belt and produces a drive connection between the pulley 25 and the pulley 43. As a result, there is a positive drive of the second mower blade in a manner believed obvious. The linkage is such that the second blade is energized shortly after the first so there is a minimal starting load on the mower motor 21.

Utilizing any suitable conventional controls in a manner well known in the art, the wheel 82 may then be moved inwardly of the frame 10 to engage the belt 36 and take up its slack. Provided the shift stick on the gear box 26 is appropriately positioned, this produces a drive of the rear axle 31 to start the movement of the mower body per se.

Thus, as is believed obvious, the invention achieves a very simple but effective starting procedure for the mower operating elements, which in this instance are cutter blades. The mechanism is not only simple but economical to fabricate and install. In use thereof the components of this system are subject to minimal stress and strain. Moreover, the starting motor is enabled to operate in a more efficient manner for a relatively extended period of time.

When it is desired to stop the cutter blades, one need only displace the wheel 82 in an obvious manner to terminate the drive of the rear wheels 32. Then a reversal of the clutch stick 52 causes the control elements to move to a position as observed in FIG. 4 of the drawings. The arm 53 pulls the interconnected bar 54 rearwardly, counter-rotating bar 57. This is assisted by the previously stressed braking spring 70. As this occurs, the braking spring 60 pulls rod 61 rearwardly, compressing spring 64 which drives the arm 66 in the same sense through the medium of its ear 65. This results in a displacement of the wheel 69 from its clutching engagement of belt 44. The belt goes slack to interrupt the positive drive from the pulley 24 to the pulley 42. Simultaneously, the brake shoe 68, under the influence of springs 70 and 60, wedges a portion of belt 44 against the pulley 42 and completely stops the interconnected cutter element.

Correspondingly, the extension 59 on bar 57 is pivoted forwardly, and with a slight time lapse freely, until the rear edge of slot 71 encounters stud 72 whereupon the rod 73 is pulled forwardly. This causes the compression of spring 76 against the ear 74 of control arm 75. The wheel 79 is thereby pulled away from the belt 45 which goes slack. In the process the shoe 78 clamps a portion of belt 45 to pulley 43 in an obvious manner, whereupon the second cutter element is completely stopped.

It may be seen that the braking of the invention system and the disengagement of the drive system from the motor 21 is very simply effected but in a most positive manner.

It is believed that from the foregoing one can observe there is in any case provided a lawnmower or like unit having optimal control features enabling the operation thereof with a minimal requirement for maintenance.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A lawnmower or like equipment including a main frame having thereon means defining a vertically displaceable interconnected platform, said platform including at least a spaced pair of horizontally projected portions, a spindle rotatably mounting to depend from at least one of said spaced pair of said projecting portions and to dispose an interconnected working element therebelow, a drive motor having a fixed mount to said platform, means defining normally inoperative connections between said drive motor and said spindles, and clutch means for rendering said normally inoperative connections operable to energize said spindles in a time spaced sequence.

2. A lawnmower or like equipment as in claim 1 wherein said motor has a dependent drive shaft incorporating vertically spaced drive elements, and each of said spindles has a driven element operatively related to one of said shaft mounted drive elements by means of a normally slack continuous connector element, said clutch means incorporating control elements adapted to take up the slack in said continuous connector elements in sequence, whereby on energizing said power source and operating said operatively related means, said spindles are started in said time spaced sequence.

3. A lawnmower or like equipment as in claim 2 characterized by a continuous linkage interconnecting said control elements to provide for their simultaneous and conjoint operation.

4. Apparatus as in claim 1 characterized by said clutch means comprising a linkage including a first pivoted control bar, a pair of pivoted control arms, at least one pair of control rods each pivoted at one end to a respectively opposite end of said bar and interconnected with one of said pivoted control arms, said control arms including portions for selectively maintaining said connection normally inoperative and other portions providing means to operatively relate said drive motor and said spindles to produce an operative connection therebetween and further control means connected to pivot said control bar to selectively and conjointly move said control rods and produce thereby a time spaced operation of said control arms to cause said connection to produce a driving relation between said drive motor and said spindles.

5. Apparatus as in claim 4 characterized by lost motion pivot connections between said control bar and control rods and further characterized by spring elements operating in said linkage to influence said linkage to urge said control arms to effect and maintain said connection to be normally inoperative.

6. Apparatus as in claim 1 characterized by pulleys fixed to each of said spindles and said drive motor, separate, continuous, normally slack belt means connecting pulleys of said drive motor and each of said spindles, a control arm pivotally mounted adjacent each of said spindle pulleys having to one end thereof a brake shoe normally applied to wedge the related belt means in a braking relation to said spindles and at its other end means operable to tension the related belt means to place it in a driving relation to the associated spindle, there being means for pivoting said control arms in a continuous sequence to achieve a time spaced tensioning of the respectively separate belt means.

7. In a lawnmower or like equipment, a frame, means supporting the frame for a generally horizontal movement over a ground surface, support means releasably secured to said frame and adapted for vertical adjustment in respect thereto, said releasably secured support means including horizontally disposed plate sections, spindle means rotatably secured to at least one of said plate sections to depend and mount cutter or like means therebelow in an adjacent relation to the ground surface and a motor means mounted on another of said plate sections having drive means in connection therewith which drive means is operatively related to said spindle means for drive thereof, spindle means being secured in each of a pair of said plate sections, said pair being in a generally common plane one at either side of said frame, said other plate section being elevated relative to said pair and said motor drive means having a driving relation to both said spindle means.

8. Apparatus as in claim 7 characterized by said frame including parallel side portions mounting transversely aligned projecting studs, said releasably secured support means including plate-like elements having included slots receiving said studs to accommodate the vertical adjustment in respect to said frame whereby to raise or lower the cutter elements which through the medium of their spindle means and said plate-like elements mount in a fixed relation to and suspended from said frame.

9. Apparatus as in claim 7 characterized by a deck means fixed to and supported by said horizontally disposed plate sections, said deck means having a peripheral skirt forming a dependent guard for said cutter or like means.

10. A lawnmower or the like, including a wheel mounted frame disposing in relatively elevated relation to ground level, a plate supported by said frame for bodily raising and lowering movements relatively thereto, motive power means mounted on said plate, said plate having a pair of horizontally disposed plate extensions to the sides thereof, a cutter spindle vertically installed in each plate extension to extend therebelow, a drive shaft vertically installed in said plate intermediately of said spindles to be rotated by said motive power means, normally untensioned individual belt drives from said shaft to said spindles, a rocket adjustable to apply and to release tension to each of said belt drives, a lever pivotally mounted to said plate and having a common connection to said individual rockers, and means accessible from above said plate for pivotally moving said lever.

11. A lawnmower or the like according to claim 10, characterized by a cutter enclosing deck mounted to the underside of said plate extensions, said spindles extending downward through said deck, said plate extensions being in a dependent relation to said plate to define a space intermediate said plate and said deck, transmission means including said belt drives, said rockers and said lever positioned in said space.

12. A lawnmower or the like according to claim 11, wherein said shaft extends into and terminates in said space, said transmission means further including unitary vertically spaced pulleys on said shaft for cooperation with said individual belt drives, and still further including pulleys on said spindles laterally aligned with respective pulleys on said shaft, said spindles having a reach to dispose attached cutters in a common plane beneath said deck.

13. A lawnmower or the like according to claim 10, wherein said frame is open and includes laterally spaced substantially parallel side rails, said plate including vertical side portions each having longitudinally spaced attachments to a respective side rail formed by a pin and inclined slot connection, said plate further including a horizontal portion intermediate said side portions and a bracket fixed to said horizontal portion, and means accessible from above said plate to raise and lower said plate by engagement with said bracket.

14. A lawnmower or the like, including an open frame, wheels supporting and dependent from said frame and fixing it in predetermined relatively elevated relation to ground level, a platform supported by said frame for bodily raising and lowering movements relatively thereto, said platform including transverse plate means maintaining a constant attitude in relation to said frame irrespective of its level of vertical adjustment and providing a mounting for operating components of the mower including a motor, dependent cutter or like elements and transmission means for selectively inter-relating said motor and cutter or like elements, and means conveniently accessible from above said frame for effecting the bodily adjustments of said platform.

References Cited
UNITED STATES PATENTS

| | | | |
|---|---|---|---|
| 1,727,933 | 9/1929 | Mitchell | 192—11 |
| 2,957,561 | 10/1960 | Musgrave | 192—11 |
| 3,038,288 | 6/1962 | Deptula et al. | 56—25.4 |
| 3,367,459 | 2/1968 | Rubin | 192—11 |

LUCIE H. LAUDENSLAGER, Primary Examiner

U.S. Cl. X.R.

192—11